July 19, 1960  H. A. MESSNER ET AL  2,945,935
INDUCTION HEATING OF CANNED GOODS
Filed Sept. 11, 1957
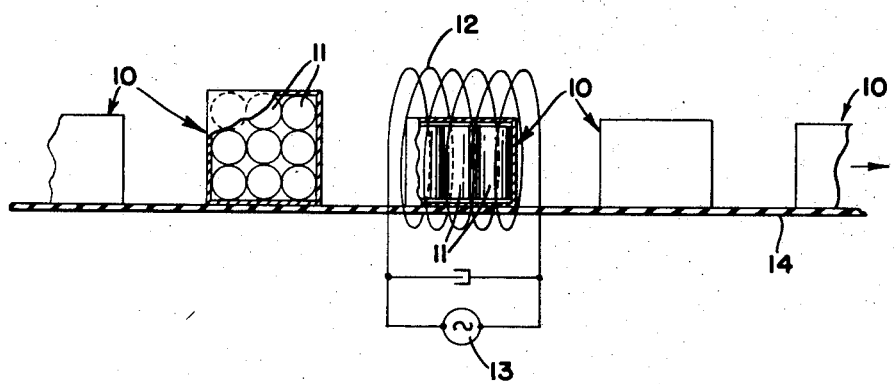
INVENTORS
HARLAN A. MESSNER +
HARRY B. OSBORN, JR.
BY
ATTORNEY 250
United States Patent Office 2,945,935
Patented July 19, 1960

2,945,935

INDUCTION HEATING OF CANNED GOODS

Harlan A. Messner, San Marino, Calif., and Harry B. Osborn, Jr., Cleveland, Ohio, assignors to The Ohio Crankshaft Company, Cleveland, Ohio, a corporation of Ohio Filed Sept. 11, 1957, Ser. No. 683,368

4 Claims. (Cl. 219—10.41)

The present invention relates to the art of induction heating and more particularly to the simultaneous induction heating of a plurality of canned goods in a carton.

The invention is particularly adaptable for use in the food industry wherein goods in metal cans are stored in cartons in cool storage places such as cold storage rooms, refrigerators, deep freezes, and the like. It is understood, however, that the invention may be used in connection with canned goods other than those used in the food industry or that it may be used whenever canned goods are moved to a place having a dew point below the temperature of the place from which moved.

Dew point may be defined as the temperature at which moisture entrained in air begins to condense out and varies proportionally to the amount of moisture entrained. It may otherwise be defined as the temperature where the relative humidity reaches 100%.

Generally, cans are packaged with several rows or a plurality of cans in each carton. Usually the cans have a paper or other identification wrapper on them and the cartons are constructed from cardboard.

It is well known that when canned goods or similar articles are moved from an area or place maintained at one temperature into an area, place, or atmosphere having a dew point lower than that temperature, condensation of water on the cans is quite likely to take place. Condensation of moisture on the cans occurs most readily when canned goods are removed from a cold storage area such as a refrigerator, and placed in higher temperatured atmosphere such as is usually found in rooms or other places in homes, stores, or the like.

The moisture condensing on the cans discolors the wrappers, may ruin the carton, and also strains and discolors the canned goods, along with the rusting away of the can. This discoloration and rusting is extremely detrimental, especially in the food industry, wherein people do not purchase canned food if there is any rust or discoloration on the surface of the can. Furthermore, if the rusting progresses to the point where it eats through the wall of the can, any food contained therein would be contaminated and injurious to the health.

Although these problems have confronted industry for a long time, a practical solution to the problem of preventing the condensation of water on the canned goods was unknown prior to the present invention. Various attempts have been made in an effort to heat canned goods, to de-humidify the atmosphere, and to use moisture-proof cartons. Each of these methods raised problems either from the extra handling of the canned goods, or the extra cost of materials.

The present invention contemplates the solving of these and other problems by devising a method and apparatus wherein the canned goods are heated to the temperature of or above the dew point of the surrounding atmosphere without removing the cans from the cartons and without opening the cartons.

In accordance with the present invention, a carton containing a plurality of or several rows of cans of goods is subjected to an alternating magnetic field capable of inducing electrical heating currents in all of the cans in the carton simultaneously to heat the cans and prevent condensation of moisture thereon.

Further, in accordance with the invention, the magnetic field is established by an induction heating coil energized at a frequency providing induced currents in all of the cans simultaneously and at a frequency in which the reference depth of the induced current is less than the thickness of the wall of any one of the cans.

In view of the foregoing problems, and the present solution of those problems, it is apparent that one of the objects of the present invention is to prevent rusting or discoloration of cans and condensation of moisture thereon when cartons of cans are removed from cold storage or the like to higher temperature atmosphere in a manner which is economical and practical.

A further object of the invention is to simultaneously heat all of the cans in a carton to a temperature above the dew point of the atmosphere or to a temperature the same as the temperature of the atmosphere in which the carton is placed without removing the cans from the carton or opening the carton.

Other objects of the invention will become apparent from the following description of a specific example or embodiment of the invention when taken in conjunction with the accompanying drawing illustrating that specific embodiment in elevational plan view.

The attached drawing illustrates, as a specific embodiment of the invention, a carton 10 containing a plurality of cans 11 cooperatively arranged with an induction coil 12 for the purpose of heating the cans to a temperature above the dew point of the surrounding air or atmosphere. The induction coil 12 is connected to a suitable generator 13 or other source of alternating current so that it will induce heating currents in all of the cans 11 in the carton 10 simultaneously.

The cartons are usually constructed from cardboard or any other suitable material and are of a size and shape so that they will hold a plurality of cans 11. Each can 11 is constructed from sheet material which is electrically conductive and is adapted to have current induced therein for heating the sheet material. In this instance, the carton 10 is illustrated as enclosing 9 cans, however, it is understood that the exact number of cans is not important to the invention and that there may be one or more cans in the carton. It is further understood that these cans may be positioned in rows as illustrated so that some of the cans are next adjacent outside walls of the carton, and some of the cans are separated or spaced from the outside wall by other cans. Generally, the cans have a wall thickness which is relatively thin.

In carrying out the present invention, a carton 10 containing a plurality or several rows of cans 11 is passed through a magnetic field established by the induction coil 12 immediately after the carton is removed from cold storage or such other similar cool place and into air or atmosphere of a higher temperature. The induction coil 12 causes magnetic flux to pass through the entire carton 10 and all of the cans 11 contained therein so that induction heating currents are induced simultaneously in all of the cans in the carton. The cartons may be passed through the coil 12 and supported therein by means of a table such as table 14, or they may be continuously moved through the coil by means of conveyor belt or other suitable means commonly known in the materials handling fields.

Alternating currents from the power source 13 flow through the coil 12 and create an alternating magnetic flux field on the inside of the coil 12, which flux passes through the paper of the carton without interference. This flux also threads into the metal of the cans and induces currents to flow therein of a frequency equal to that of the power source. These currents heat the metal of the can in accordance with known principles. This heat is conducted inwardly through the contents of the can and, if the heating were continued for a long enough time, the entire contents of the can could be raised to any desired temperature.

The total amount of heat supplied to the cans, in accordance with the invention, must be sufficient so that after the cans are removed from the coil 12, they will be at a temperature equal to, or in excess of, the dew temperature of the surrounding atmosphere. Obviously, this dew temperature will vary dependent upon the amount of moisture entrained in the air which, in turn will be dependent upon conditions beyond the scope of the invention. Thus, in the summertime, when the relative humidity is high, the dew point is high and the final temperature of the cans must also be high. In the wintertime, however, the relative humidity of the air inside of heated buildings is relatively low and the final temperature which the cans must reach can be lower. Suffice it to say that if an amount of heat is supplied to the cans so that the final temperature will be equal to the surrounding room temperature, no problem of condensation will result.

The total amount of heat supplied to each can will depend upon the rate of heating and the length of time of heating. Thus, the rate of heating can be relatively low and the heat supplied for relatively long periods of time. Alternatively, the rate of heating can be high and the length of time of heating held relatively short. Normally, the rate of heating will be as high as is possible without overheating the surface of the can. Thus, if the rate of heating is too high, the surface of the can can be raised to temperatures sufficient to either melt the solder or to scorch the label, even though the contents of the can have not been appreciably heated. Thus, the rate of heat conduction through the contents is ordinarily much slower than through metal, and it is possible to have the outer surface of the contents at the boiling temperature while having the inner core of the contents still frozen. Obviously, if a can in this condition were then set aside, the heat on the external portions of the contents would be conducted inwardly and if the total amount of heat supplied were proper, the final temperature of the can and contents would be as desired.

As the rate of heating will vary dependent upon the contents of the can and their condition before being placed in the coil 12, it is impossible to specify rates of heating.

The coil 12 may be of any desired shape, but preferably has a cross-sectional shape approximately the same as the cross-sectional shape of a carton. The ratio of the cross-sectional area of the coil 12 to the ratio of the cross-sectional area of a carton should be kept as small as possible.

The frequency of the power source 13 will depend, to some extent, upon whether the cartons contain several layers of cans on the inside, or whether there is only a single layer. Thus, if a single layer of cans is employed, the frequency is relatively unimportant but somewhat better electrical couplings to the cans can be obtained by using frequencies on the order of 3,000 to 10,000 cycles per second. However, when multiple layers of cans are employed, the frequency is preferably held relatively low, for example, to 60 cycles per second. With such a frequency, the reference depth of flux penetration is greater than the thickness of the metal of the can. Thus, the flux, or at least portions thereof, will pass through the can and will act on cans in the center of the carton, thereby uniformly heating all the cans in the carton at one time.

The invention has been illustrated in the drawings somewhat schematically. Obviously, mechanical or automated means may be employed for moving the cartons through the coil 12, or the coil 12 may be made portable and moved from one carton to the other.

In using the invention, the desired final temperature to which the cans must be raised must be determined by determining the dew point of the surrounding atmosphere into which the cans will move following their removal from the cold storage area. The amount of heat to be supplied to each can must also be determined, taking into consideration the final temperature and the temperature of the cold storage area. The amount of energy supplied to the coil 12 should then be made as high as possible while preventing the overheating effects above referred to; taking into account the rate of energy supplied to the coil 12, the time of heating may then be determined.

Using the invention, the problems of preventing the condensation of moisture on cans as they are removed from cold storage area, together with the result thereof, namely, discoloration, rust, or the like, are obviated, and it is possible to prevent this condensation of moisture while the cans are still within their original carton.

It will be appreciated that in some instances, the invention could be employed to heat the cans individually as they move from a storage area into a shipping carton.

The invention has been described with reference to a preferred embodiment. Modifications and alterations will occur to others upon a reading and understanding of this specification, and it is our intention to include all such modifications and alterations insofar as they come within the scope of the present invention.

Having thus described our invention, we claim:

1. A method of preventing moisture condensation on a plurality of thin-walled cans contained in a carton which has been in cold storage at a temperature substantially below the temperature of a new environment where the cans are to be stored, said method comprising the steps of: removing the carton with the cans therein from cold storage to a new environment having a temperature substantially higher than that of the cold storage environment; and, while the thin-walled cams remain in the carton and are at a temperature substantially below that of the new environment, subjecting the plurality of thin-walled cans in the carton to induction heating at a frequency of the order of 60 cycles per second for a time sufficient to raise the temperature of the thin-walled cans to a value above the dew point of said new environment.

2. The method of claim 1 wherein said induction heating step is performed before any substantial moisture condensation has taken place on the cans in the new environment.

3. The method of claim 1 wherein said carton remains closed during said induction heating step.

4. The method of claim 1 wherein the cans are inductively heated to a temperature at least as high as that of said new environment.

References Cited in the file of this patent

UNITED STATES PATENTS

| | | |
|---|---|---|
| 1,821,530 | Spire | Sept. 1, 1931 |
| 2,301,589 | Shepard | Nov. 10, 1942 |
| 2,385,904 | Witty | Oct. 2, 1945 |
| 2,532,460 | Phillips | Dec. 5, 1950 |
| 2,671,160 | Segsworth | Mar. 2, 1954 |